United States Patent [19]
Dunnett et al.

[11] Patent Number: 4,866,422
[45] Date of Patent: Sep. 12, 1989

[54] SECURITY ALARM SYSTEM

[75] Inventors: Roy V. Dunnett, Ipswich; Arthur C. Lowe, Dovercourt; Frederick C. Grigg, Ipswich, all of United Kingdom

[73] Assignee: PSC Limited, Suffolk, England

[21] Appl. No.: 192,624

[22] Filed: May 11, 1988

[30] Foreign Application Priority Data

May 14, 1987 [GB] United Kingdom ................ 8711382

[51] Int. Cl.⁴ .................... G08B 1/08; B60R 25/10
[52] U.S. Cl. .................... 340/539; 340/571; 340/572; 340/566; 340/590; 340/825.32; 340/429; 340/432; 340/568; 307/10.4
[58] Field of Search ............ 340/539, 566, 590, 63, 340/64, 65, 571, 572, 429, 432, 568, 825.32; 307/10 AT, 10.1, 10.2, 10.4, 10.5

[56] References Cited

U.S. PATENT DOCUMENTS

| | | | |
|---|---|---|---|
| 3,740,713 | 6/1973 | Teich | 340/64 |
| 3,824,540 | 7/1974 | Smith, II | 340/63 |
| 3,864,675 | 2/1975 | Colibert | 340/65 |
| 3,961,323 | 6/1976 | Hartkorn | 340/539 |
| 3,967,166 | 6/1976 | Wei | 307/10 AT |
| 4,151,506 | 4/1979 | Schoenmetz | 340/63 |
| 4,262,284 | 4/1981 | Stieff et al. | 340/542 |
| 4,284,973 | 8/1981 | Howell et al. | 340/65 |
| 4,320,382 | 3/1982 | Roucek | 340/64 |
| 4,369,437 | 1/1983 | Thompson, Jr. et al. | 340/539 |
| 4,450,326 | 5/1984 | Ledger | 340/65 |
| 4,485,887 | 12/1984 | Morano | 340/63 |

FOREIGN PATENT DOCUMENTS

| | | |
|---|---|---|
| 0010084 | 1/1979 | European Pat. Off. . |
| 931988 | 8/1955 | Fed. Rep. of Germany . |
| 2560131 | 8/1983 | France . |
| 2587664 | 9/1985 | France . |
| 8303083 | 9/1983 | PCT Int'l Appl. . |
| 821260 | 10/1959 | United Kingdom . |
| 1598847 | 9/1981 | United Kingdom . |

Primary Examiner—Donnie L. Crosland
Attorney, Agent, or Firm—Kinzer, Plyer, Dorn, McEachran & Jambor

[57] ABSTRACT

A security unit is to be fitted to a goods container to be secured, normally to the load doors, and will transmit a radio signal when it is interfered with to a radio receiver which gives the alarm. Where the container is part of or is loaded on a vehicle, then in addition to this security for the container itself, the alarm system will have to be immobilized by an authorized driver before the vehicle can be driven by inserting two different keys in a predetermined time sequence before the vehicle can be operated.

13 Claims, 9 Drawing Sheets

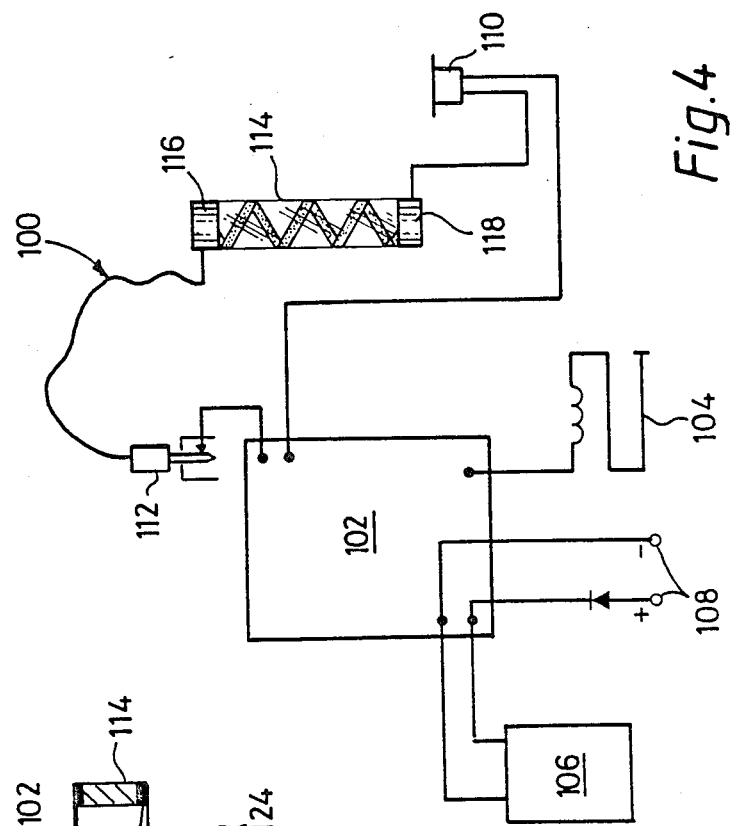
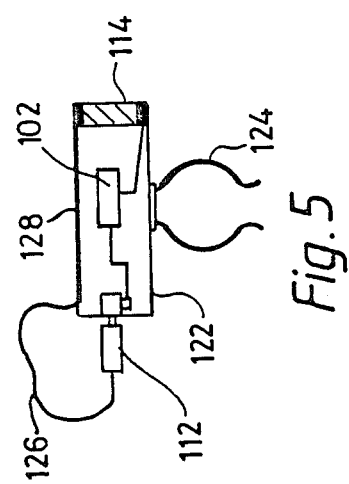

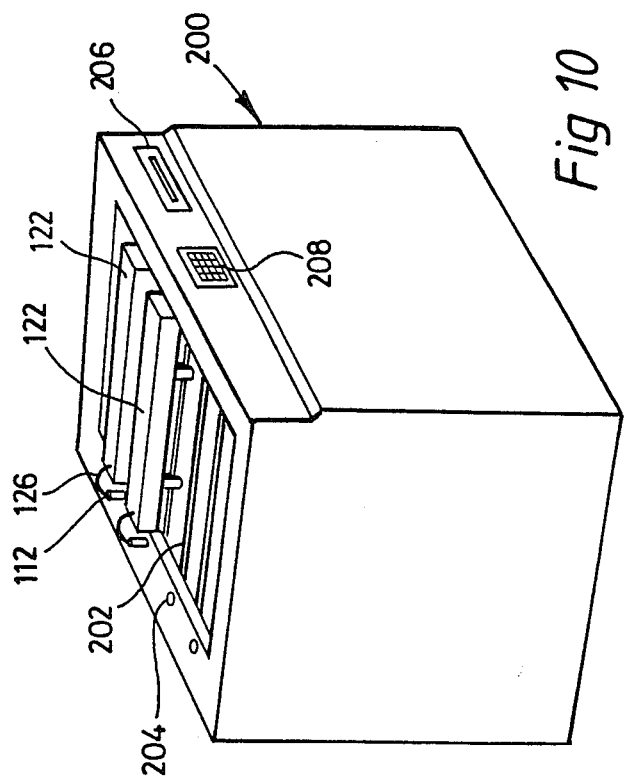

SECURITY ALARM SYSTEM

This invention relates to an alarm system for vehicles and for goods containers, particularly for lorries and other goods vehicles and in particular to a security unit for use as part of such an alarm system.

In this specification, the term "container" includes not only standard shipping containers, but also any structure (whether mounted on wheels or not) in which goods are contained and which can be moved.

Various vehicle alarm systems have been proposed in the past. Generally speaking however each such alarm system only addresses one of the possible areas where alarm functions are required in order to provide a full security system for the vehicle. Thus one such alarm function is required to operate in the event of unauthorized attempts to start the vehicle and drive it away. Another alarm function is required to operate in the event of any tampering with the load carried by the vehicle. A third alarm function is required to operate in the event of attempted hijacking of the vehicle.

It is an object of the present invention to provide a vehicle alarm system which operates in the event of any tampering with the vehicle load, and which can also form part of a larger system which performs two or more of the above functions.

According to a first aspect of the invention there is provided a security unit for mounting on a part of a container to be secured, the unit comprising a tamper-sensitive mechanism and a radio transmitter arranged to receive a tamper-indicating signal from the tamper-sensitive mechanism and to transmit a corresponding radio signal to a remote radio receiver.

The security unit will normally be secured to the rear, load doors of a load carrying vehicle or container and the remote receiver may be located in the cab of the vehicle and/or at the vehicles depot or base. An alarm signal can also be relayed from the receiver to a pocket pager unit. In this way an alarm can easily be given to the right location and the use of radio communication rather than a fixed link allows the system to be operated very simply and without the necessity for unduly powerful radio transmitters. When the vehicle is out on the road, the driver will either be in the cab or fairly close by and he will receive a signal either in the cab or through his pocket pager if, for example, he is eating in a nearby cafe. If the load is however being stored in a depot, without a cab attached to it then the receiver at the depot will receive the signal.

The tamper-sensitive mechanism can include a conductive loop which can be closed around a part of the vehicle to be secured together with a vibration sensitive switch and possibly a fragile conducting element so that the conductive loop will be open if the unit is interfered with in any way.

In order to form a complete security system where the movements of loads are properly monitored, the security units may be used in conjunction with a storage unit into which the security units are plugged so that the security units have to be electronically "signed out" and at any one time are either in use on a vehicle or are mounted in the storage unit, with a short, predetermined time being allowed for them to be moved between these two conditions.

According to a second aspect of the invention, there is provided a vehicle alarm system comprising an alarm signaling unit to be installed in a vehicle and arranged so that an alarm is signaled upon occurrence of either or both of (a) an unauthorized attempt to start the vehicles engine or (b) an unauthorized attempt to tamper with the vehicle's load, the system including an alarm deactivation circuit which includes the vehicle's key-operated ignition switch, a second key-operated switch and a time delay circuit connected between the switches so that a deactivation signal is sent to the alarm unit only if the two switches are operated within a preset time period.

The time period preferably commences with the operation of one of the switches, but alternatively may commence with the opening of a door of the vehicle.

The system may also be capable of signaling an alarm if an attempt is made to hijack the vehicle ie to take over command of the vehicle whilst the driver is at the controls.

The alarm signaling unit may comprise a sound emitter such as a horn or a siren and/or a visual warning signal such as an illuminated sign or a flashing light or lights.

In addition to such alarm signals, the system may also include security devices, for example a fuel cut-off and/or ignition protection to prevent bridging across the ignition switch.

Alternatively or additionally, a seismic detector may be arranged on the vehicle doors, and the sensitivity of this protector can be set so that it will be triggered on the occurrence of any unexpected noise.

Either or both of these mechanisms may include a movement-sensitive tilt switch as additional protection.

The alarm signaling unit can also activate a paging device when an alarm is signaled, so that the vehicle's driver is alerted even though he may be temporarily away from his vehicle.

The system preferably includes a dedicated back-up battery to ensure that the alarm will still operate even if the main vehicle battery is disconnected.

Where a hijack alarm is fitted, there may be an activation switch accessible to the driver, with the switch connected in an associated delay circuit so that the alarm only operates a certain length of time after the switch has been operated, in order to safeguard the person of the hijacked driver.

As an additional hijack alarm arrangement, an alarm signal may be produced if a vehicle door is opened whilst the engine is running.

The system may also include a transmitter for transmitting an alarm signal to a remote location such as a police station or the vehicle's depot.

The invention will now be further described, by way of example, with reference to the accompanying drawings, in which:

FIG. 4 shows a circuit for a load door security unit in accordance with the invention;

FIG. 5 shows the construction of the unit of FIG. 4;

FIG. 10 shows a storage unit for security devices.

Figure 1:
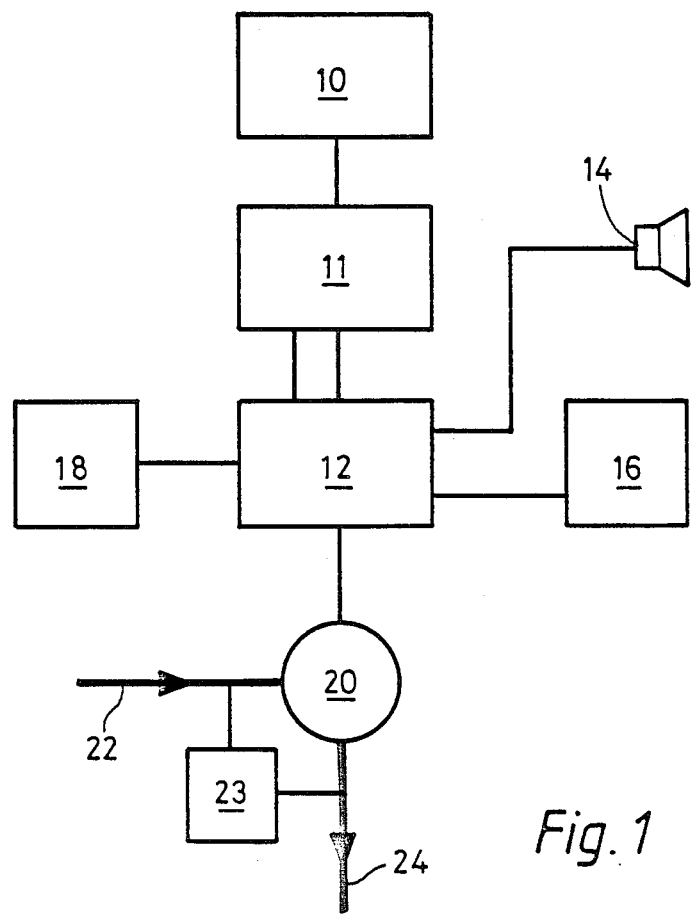
FIG. 1 is a block diagram showing a simplified outline of a system in accordance with the invention.

In FIG. 1, a key-operated security switch 10 is connected, through a time delay 11, to an alarm deactivation module 12. Connected to the module 12 are alarm emitters 14 and 16, with 14 being shown as a sound emitter. The alarm emitter 16 will display a visual warning signal, for example by causing the vehicle headlights to flash on and off. An alarm sensor is shown schematically at 18 and an ignition switch is shown at 20 with conductors 22 and 24 carrying the ignition current being shown as broad lines. An ignition cut-off protection module is indicated at 23.

In use, the operator who will normally be the driver of the vehicle must insert a key into the security switch 10 before doing anything else. Operation of this security switch sends a pulse which deactivates the alarms for a short period (say 10 seconds) and within this period it is possible to start the vehicle without an alarm being triggered. Thus the driver can then insert his ignition key into the ignition switch 20 and start the vehicle. Provided this is satisfactorily completed within the time period during which the alarm is deactivated, no alarm will sound and the vehicle can be driven normally. However if an attempt is made to operate the ignition switch outside this period then the module 12 will signal an alarm state which will result in either or both of the alarm emitters 14 and 16 being activated. Additionally, an alarm sensor 18 which may sense any one of a number of aspects of the vehicle operation will be deactivated on operation of the security switch 10, for the same period.

The security switch 10 will normally be mounted in a concealed place where it can be reached by the driver from his driving position. He can then insert the necessary key in the security switch and turn it and then immediately operate the vehicle's ignition. However a thief without the knowledge of the additional key or without the knowledge of the order and timing within which the two keys must be operated would cause an alarm state to be signaled and an alarm to be given.

Figure 2:
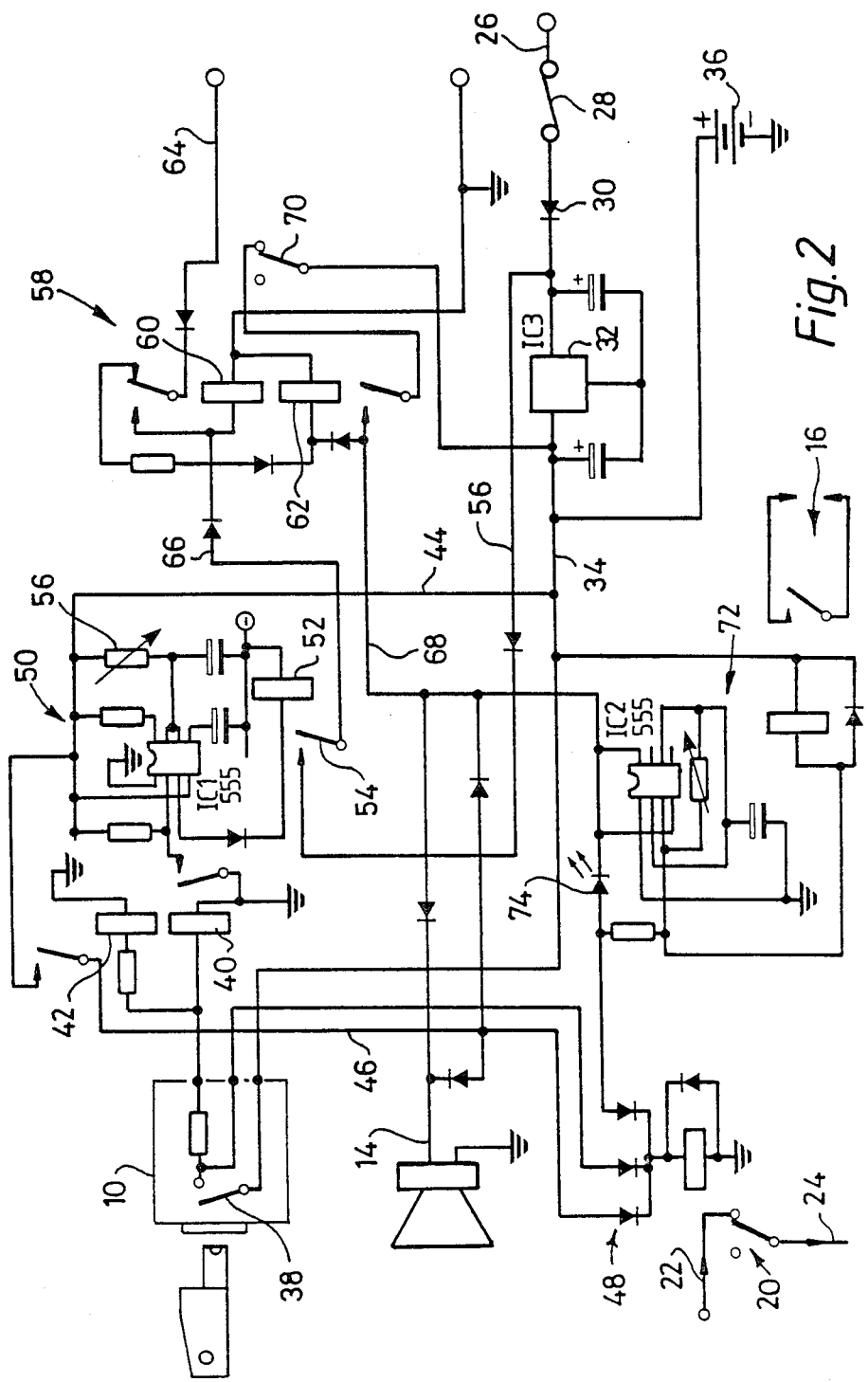
FIG. 2 shows a circuit for a main security unit for the system.

In FIG. 2, the ignition switch 20 is shown in the bottom left hand corner. On the right of the Figure the battery voltage input at 24 volts comes in on the line 26 and is protected by a fuse 28 before passing on the line 34. Also feeding into this line is a through a voltage control diode 30. Through a voltage regulator circuit 32, a 12 volt dc signal is produced secondary voltage source from a 12 volt standby battery 36 which provides power to the alarm system should the main vehicle battery be disconnected.

The voltage on the line 34 is passed to one side of switch contacts 38 in the security switch 10. When the key is inserted, the switch contacts are made and current is passed to two relays 40 and 42 which operate respective switch contacts.

When the relay 42 is energized, it causes current to be applied, through branch lines 44 and 46, to a starter cut off circuit generally indicated at 48. The relay 40 triggers a timer circuit 50. The timer circuit controls a relay 52 with associated switch contacts 54 such that whilst the timer is counting to the end of a preset period, current passes to the relay 52 to close the contacts 54 to temporarily deactivate the alarm. The time period can be controlled by a variable resistor 56.

When the contacts 54 are closed, current is passed along the line 66 to an ignition key monitor circuit 58. The circuit 58 has two relays 60 and 62 in parallel.

This monitor circuit is supplied with a line voltage from a normal run part of the ignition system on the line 64. Until a current is passed along the line 66 from the contacts 54, the switches controlled by the relays 60 and 62 are in the positions shown, that is with the switch controlled by relay 60 being set so as to pass current from the line 64 to the relay 62 which holds its associated contacts in the open position so that no current passes to alarm units 14 and 16. However if the voltage on the line 64 disappears, for example because the battery is disconnected, the relay 62 will cease to be operative and its associated switch contacts will close so that current passes along the line 68 to the alarm circuits 14 and 16.

When the contacts 54 are closed, the relay 60 also closes its contacts. The relay 62 is deenergised and its contacts also close to provide a conducting path to the alarm circuits.

The key monitor circuit is subject to the absence or presence of a key in the ignition switch, and this will be picked up through a switch 70. In the position shown, which is a "key present" position, the switch 70 provides a conducting path from the voltage regulator 32 through to the relay contacts 62.

If a key is placed in the switch 70, without the security switch 10 having been operated first, the making of the switch 70 will cause current to be sent to the sounder 14 and to a headlamp flasher unit 16. An alarm will be given.

If the security switch 10 is operated first, then the relay 60 will be operative during the time period set by the timer 50, so that the line voltage 64 will no longer be applied to the relay 62, and the contacts controlled by the relay 62 will open so that no alarm signal is passed when the ignition switch 70 is made.

Figure 3:
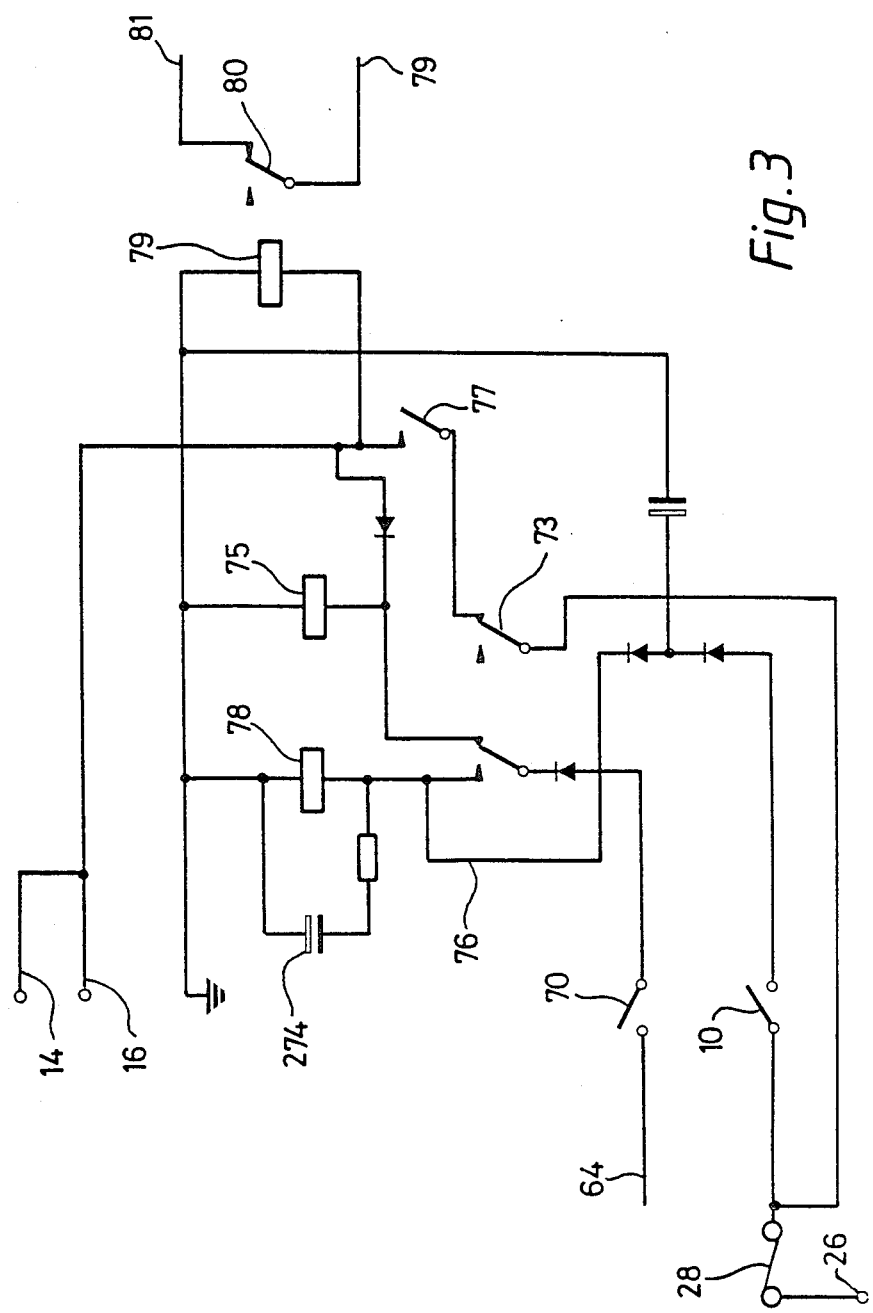
FIG. 3 shows an alternative starter cut-out circuit.

The headlamp flasher unit 16 is controlled by a conventional flasher circuit 72, with an LED 74 operating to indicate the flasher has been activated. FIG. 3 shows an alternative ignition cut out circuit which is less complex than that in FIG. 2 and which has no timer as such. Instead, the time delay is set by the time taken for a capacitor 74 to discharge. In FIG. 3, components which have a direct counterpart in FIG. 2 carry the same reference numbers as in FIG. 2.

In FIG. 3, the rest positions of the various switches are shown. The ignition key switch 70 is normally open, but is closed when a key is inserted in the switch.

Firstly, if an ignition key is inserted without the security switch 10 first being operated, then current will pass along the line 64, through the double switch 73 to a relay 75. This relay pulls across a switch 77 which feeds current from the vehicle power source 26 to the alarm units 14 and 16. An alarm would then be signalled.

However if the security switch 10 is first made, a current is passed along the line 76 to feed into the capacitor 74 which thereby becomes charged. The capacitor current then holds the relay 78 in a position where the double switch 73 is switched from the position shown. The right hand half of that switch then prevents any current being fed to the switch 77 and to the alarm circuits. The vehicle can then be started in the normal way.

Furthermore, if an ignition key is inserted without first having operated the security switch 10, current will also be fed to a relay 79 which will operate the switch 80 to prevent ignition current flowing to the starter circuits.

Most lorries, and in particular containers which are carried on lorries have access doors to the load space which have appropriate latches and locks to keep the doors closed. In order to produce an alarm signal if an unauthorized attempt is made to open the doors, a conductive loop is passed around an appropriate part of the locking mechanism such that that part of the mechanism cannot be used without breaking the loop and thereby triggering an alarm.

FIG. 4 shows a circuit whereby this can be done. The conductive loop circuit is indicated at 100 and each end of the conductive loop is connected to a transmitter 102. The transmitter has an aerial 104 by which it can send a digital signal to a remote receiver, so that the receiver signals an alarm, and a battery 106. The battery is rechargeable through recharge terminals 108.

The loop 100 includes three separate components, any one of which may be instrumental in breaking the loop and thus giving rise to an alarm indication. The first of these components is a movement-sensitive tilt switch 110. The second is a jack plug 112 which fits into a conventional jack socket and can be connected and disconnected when the vehicle doors are closed and the loop is set up. The third component 114 is a glass tube which has conductive end portions 116 and 118 and a trail 120 of conductive paint which extends around the circumference of the tube between the end portions. If a violent attempt is made to interfere with the doors, the tube 114 will smash and the conductive path 120 will be interrupted.

FIG. 5 shows how this unit can be installed. A generally non-conductive housing 122 carries a clip 124 which can be clipped onto part of the locking mechanism at the back of a vehicle. A wire loop 126 is connected between the jack plug 112 and a conductive path 128 on the housing which leads to one end of the glass tube 114. The tilt switch 110 can be located inside the tube 114, for ease of packaging. The transmitter 102 is then located inside the housing 122. To fit this device once the doors have been closed, the whole unit is clipped onto the back doors and the jack plug 112 on the end of the wire 126 is passed around a suitable part of the locking mechanism and reinserted in the jack socket to complete the loop. Whilst this is being done, the alarm system must be deactivated in order to prevent the alarm being set off at this stage.

Figure 6:
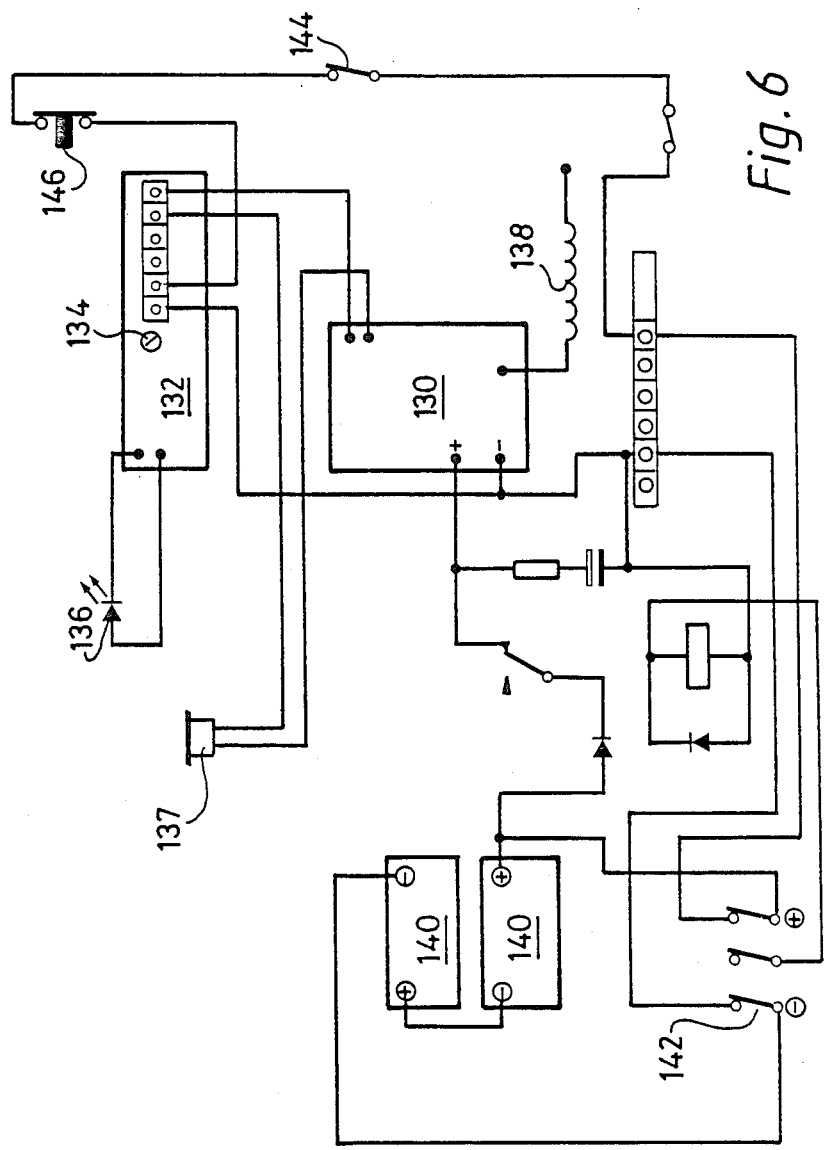
FIG. 6 shows a circuit for another load door security unit.

FIG. 6 is an alternative type of detector to be placed adjacent the load doors of the vehicle. This detector is not sensitive to any particular operation such as attempted opening of the vehicle door latches, but instead is sensitive to any unexpected vibration or noise adjacent the doors.

This unit also has a transmitter 130 and the detector unit 132 is connected to the transmitter. The detector unit may be a vibration/seismic detector sold under the name of VIPER. The detector has a sensitivity calibration setting screw 134 and an external LED 136 to show when the detector has been triggered. The detector 132 is connected in series with a movement-sensitive tilt switch 136, such that tripping of either of these two will cause the transmitter 130 to transmit a digital signal to a remote receiver, by way of its aerial 138. A power source comprising two batteries 140 provides the necessary power to the transmitter, and a jack socket 142 allows a charging input to be connected and also provides a checking function. A normally closed anti-tamper switch 144 is fitted in the circuit, along with a reset switch 146 which is used to enable the unit to be reset after installation or after an alarm has been triggered.

The jack plug which fits in the socket 142 will normally be coded so that the correct plug is required to enable the unit to be checked, deactivated or reset.

In a preferred form, the security unit has a tilt-sensitive sensor, a sound-sensitive sensor and a conductive loop.

Figure 7:
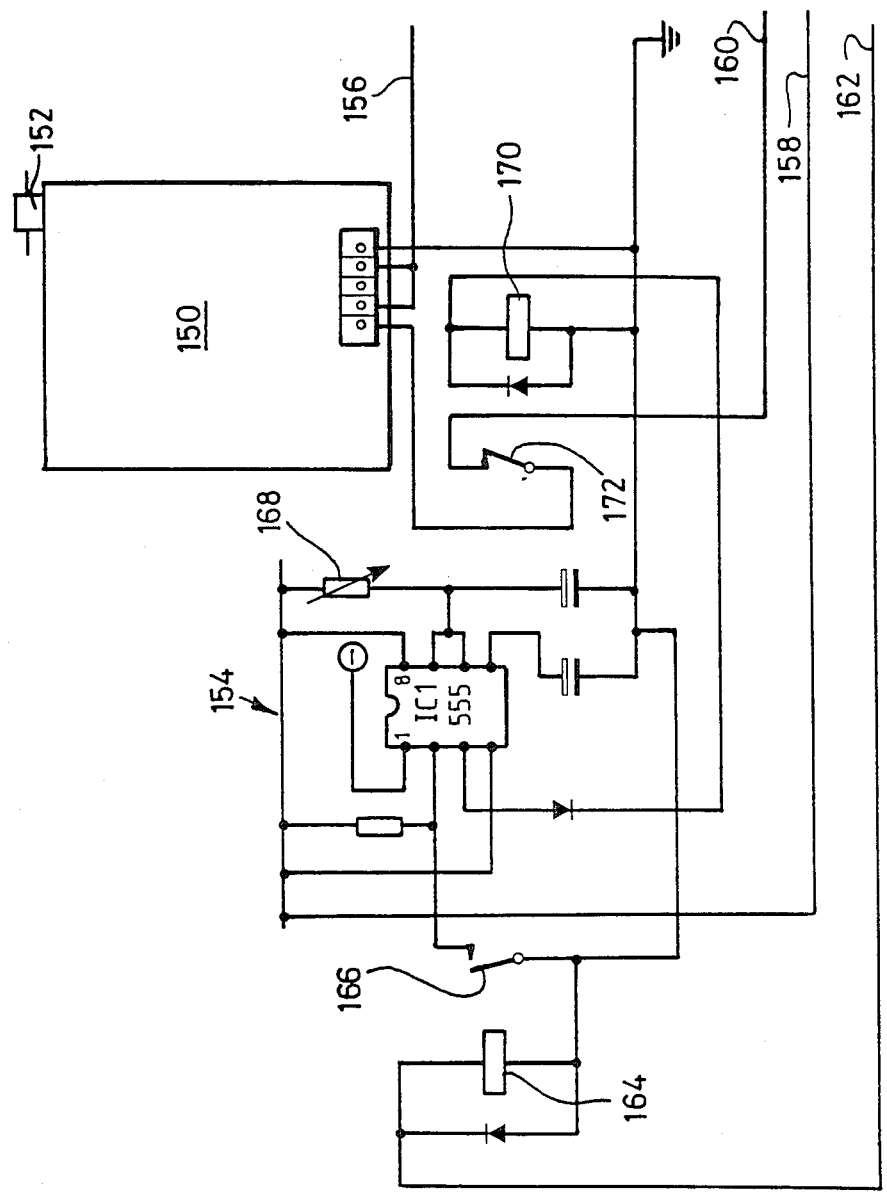
FIG. 7 shows a circuit for a receiver for receiving signals from the security units of FIGS. 4 and 5.

FIG. 7 shows a receiver which will receive signals from either of the units shown in FIGS. 4 or 6 and produce an alarm signal. Normally the units of FIGS. 4 and 6 will be mounted at the rear of the vehicle, whereas the receiver will be mounted in the vehicle cab, along with the other alarm circuitry shown in the previous Figures.

The unit has a receiver 150 with a receiver antenna 152. The associated circuit has a timer section 154 which allows the security key 10 to be operated. 12 volt input signals are supplied on the lines 156 and 158. An alarm signal is emitted on a line 160, and a signal from the security key 10 is input on a line 162. The security key signal energizes a relay 164 which closes a contact 166 and allows the timer circuit 154 to start counting. The period counted will be controllable through the use of a variable resistor 168. Once the counting has been completed, current is passed to a second relay 170 which closes contacts 172. Thereafter, when an alarm signal is received by the receiver 150, an alarm operating signal is sent out on the line 160.

The alarm system described thus produces an alarm signal either if an unauthorized attempt is made to start the vehicle's engine by using the ignition key without the security key, or in the wrong relationship to operation of the security key, and also produces a signal if the load doors are tampered with.

Both of these signals can be deactivated because this is necessary for example to enable the vehicle to be serviced and to enable authorized loading and unloading to take place.

Figure 8:
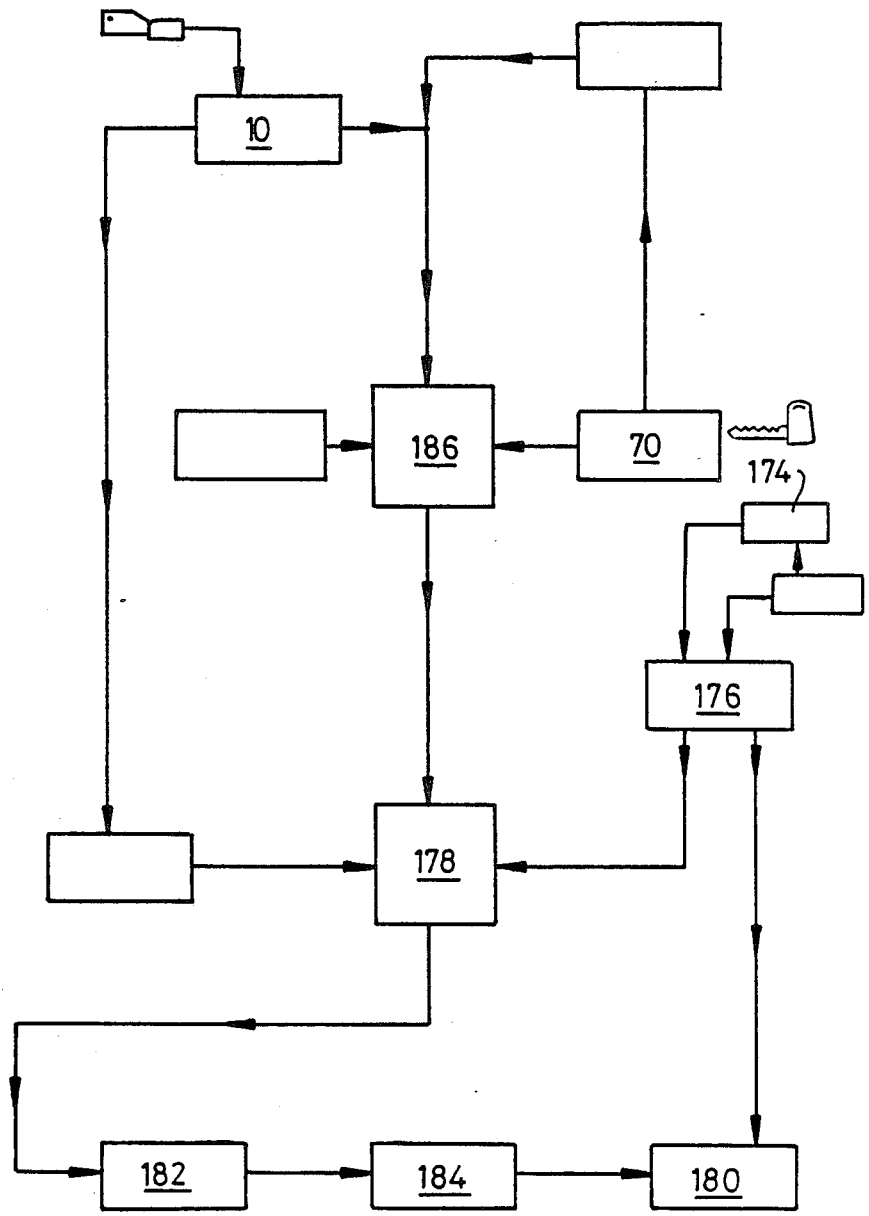
FIG. 8 is a block diagram illustrating further optional features for the system.

FIG. 8 indicates alternative alarm modes for use when an anti-hijack alarm is fitted. In addition to the alarm modes already described, a further alarm system can be set into operation by operating a foot switch 174. This switch will be operated if the driver is attacked in his cab whilst the vehicle is running, ie after it has been correctly started using the reset key in the proper sequence. It may be dangerous to the driver if an alarm is set off immediately an attack takes place because then the attackers may injure or kill the driver himself. To avoid this, operation of the foot switch operates a timed cut-out unit 176 which will generate, after a preset time, an alarm 178 and also a fuel cut-off 180. It is hoped that the delay thus introduced will be sufficient to ensure that the driver is away from the vehicle when the vehicle begins to emit its alarm. The alarm may take the form of flashing lights such as the headlights 182, and/or a sounding horn 184. In addition to this alarm system, an alarm of the type already described can also be incorporated and this is indicated at 186. In addition to the mechanisms already described, an alarm may be provided on the vehicle doors so that once the vehicle has been properly started up, opening of the doors with the engine running produces an alarm state.

Figure 9:
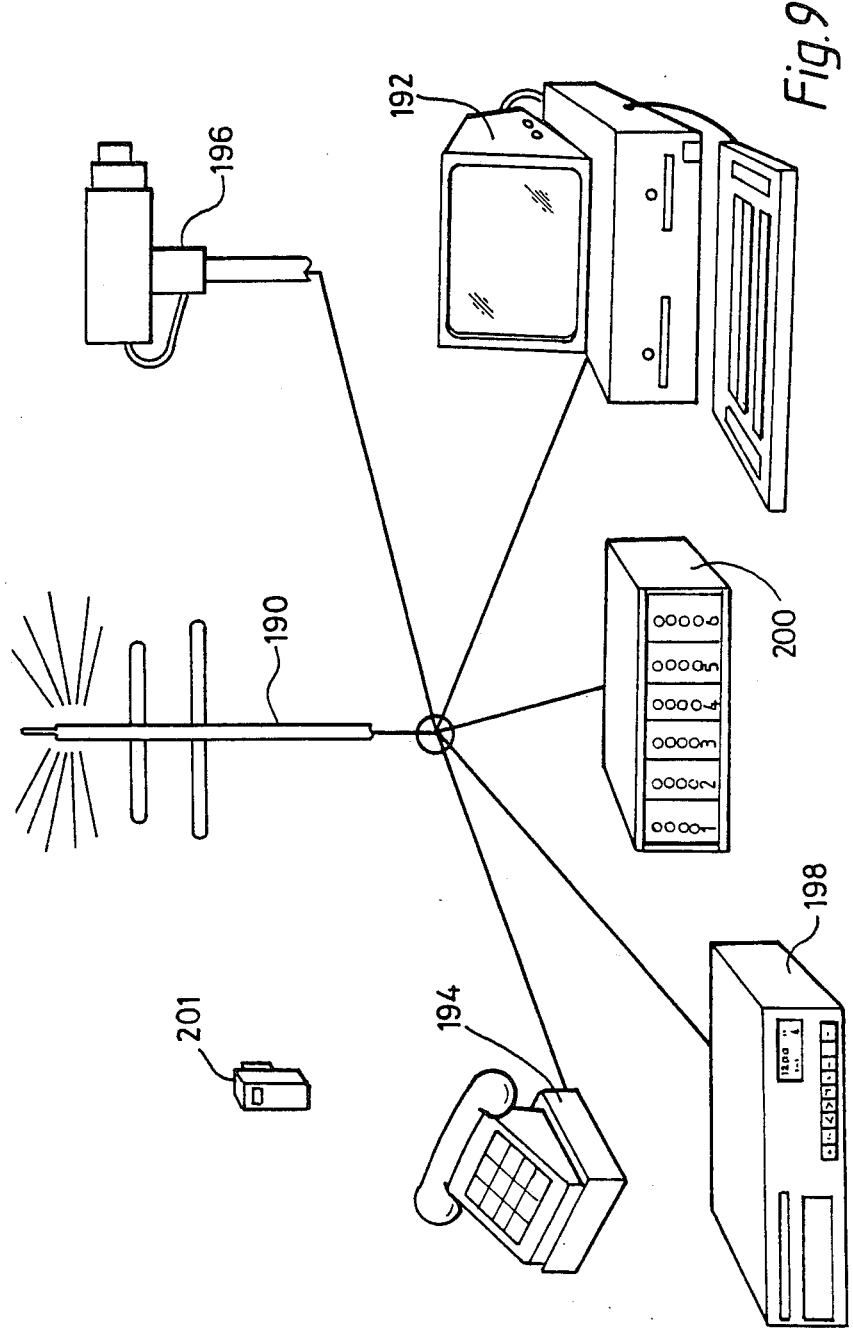
FIG. 9 is a plan illustrating ancillary devices.

FIG. 9 indicates schematically a remote monitoring system which could be applied for example to all the vehicles of one company. In addition to triggering alarms on the vehicle, the sensing of an alarm state can transmit a signal to a remote aerial 190, and this signal can be picked up and passed to a computer 192 and/or sent via a telephone line through a modem 194 to a central location.

Where vehicles are parked in a depot, a closed circuit TV camera 196 can watch over the vehicles and can be directed to a particular location if an alarm is signaled. A video recorder 198 can record whatever is seen by the camera 196. An interface 200 can direct the signals to other locations.

A further feature is the provision of a portable receiver 201, similar to a paging device, which the driver can carry with him when he leaves his vehicle so that if an alarm condition arises whilst the driver is away, the receiver will receive a signal and will emit a warning to the driver.

In order to maintain a constant check over the whereabouts of the security units, and in order to be sure that the security units are only used by authorized drivers, the units are stored in a secure storage unit shown in FIG. 10. The whole system will be overseen by the computer 192, and the computer will know, in respect of a particular security unit, that it is either in the storage unit 200 or is booked out to a particular driver.

The storage unit shown has provision for four security units 122. Two of the units are shown in place in the storage unit, and two empty sockets are present for units that are out.

The units 122 clip onto bars 202 and the jackplug 112 on the wire loop 116 is plugged into a socket 204 on the storage unit. A conductive loop is then completed within the storage unit itself to indicate that the particular security unit 122 is "at home".

In order to take one of the security units out for use, it is necessary for the driver to insert his own personal identity card in a card reader slot 206 and to punch in his own individual identification number on a key pad 208. Once this data has been verified, then the respective jackplug can be withdrawn and the unit taken away to the lorry or trailer where it is to be used. The system will allow the driver a predetermined time (say 3 minutes) between the times that the unit is taken from the security device and the time when the conductive loop is remade by passing the wire loop 126 around the vehicle door catch and reinserting it in the socket on the security unit itself. If any of this procedure is not followed correctly, then an alarm signal will be triggered.

The alarm system described thus provides an overall vehicle security concept which protects both the vehicle itself and its load, without being too complicated to put into operation.

We claim:

1. A security unit for mounting on a part of a goods container to be secured, the unit comprising a housing, a tamper-sensitive mechanism, a radio transmitter and an aerial within the housing arranged to receive a tamper-indicating signal from the tamper-sensitive mechanism and to transmit a corresponding radio signal to a remote radio receiver, wherein the tamper-sensitive mechanism includes an electrically conductive loop which can be closed around the part of the container to be secured, which loop extends partly inside and partly outside the housing and includes within the housing a conductive track formed on the surface of a fragile substrate, and said loop further including a vibration-sensitive switch which opens or closes when subjected to vibration or movement beyond a predetermined magnitude, the mechanism being adapted to emit a tamper-indicating signal if the loop is broken by either the fragile substrate or the vibration sensitive switch.

2. A security unit as claimed in claim 1 comprising means for removably mounting the housing on the container part to be secured.

3. A security unit as claimed in claim 2, wherein the housing is provided with spring clips for attachment to a cylindrical component on the container.

4. A security unit as claimed in claim 2, wherein the conductive loop includes a flexible electrical conductor with a plug at its free end which extends from the housing and wherein the housing has a socket for receiving the plug so that the conductor can be passed around a part to be secured and then plugged into the socket to complete an electrically conductive loop.

5. A security unit as claimed in claim 4, wherein the substrate is a glass tube and the conductive track is a helical track formed around the surface of the tube.

6. A security unit as claimed in claim 2, wherein the housing includes an internal aerial.

7. A security unit as claimed in claim 1 in combination with a remote alarm signaling device, the alarm signaling device including a radio receiver adapted to receive a signal from the radio transmitter on the security unit.

8. The combination claimed in claim 7, wherein the alarm signaling device is in a vehicle tractor unit and the security unit is on a trailer unit to be towed by the tractor unit.

9. The combination claimed in claim 7, wherein the alarm signaling device is portable and can be carried on the person.

10. The combination claimed in claim 7, wherein the alarm signaling device is in a fixed place and the security unit is on a vehicle stored in the vicinity of the fixed place.

11. A security installation comprising at least one security unit having a housing to be removably mounted on a part of a goods container to be secured,
the housing containing a tamper-sensitive mechanism which includes an external flexible insulated wire with a plug at its free end and a socket on the housing for receiving the plug, an internal conductive track formed on the surface of a fragile substrate and a vibration-sensitive switch which opens or closes when subjected to vibration or movement beyond a predetermined magnitude, and a radio transmitter arranged to receive a tamper-indicating signal from the tamper-sensitive mechanism and to transmit a corresponding radio signal to a remote radio receiver, and
a storage unit for storing said at least one security unit, the storage unit having a socket into which the security unit plug can be placed to connect the security unit into a circuit, and data inputting means associated with the circuit so that an alarm signal is initiated if the security unit plug is removed from the storage unit socket prior to the correct data having been input.

12. The installation claimed in claim 11, wherein the data inputting means includes a magnetic card reader and a keypad.

13. The installation as claimed in claim 11 wherein the security installation is in a compound for storing goods containers, the installation including at least one video camera arranged to survey the compound and a control unit for controlling the or each camera, means for recording images seen by the camera and an alarm signaling device.

* * * * *